B. H. PURCELL.
UNIVERSAL CARRIER CHAIN.
APPLICATION FILED APR. 2, 1921.
1,424,850.
Patented Aug. 8, 1922.
3 SHEETS—SHEET 1.
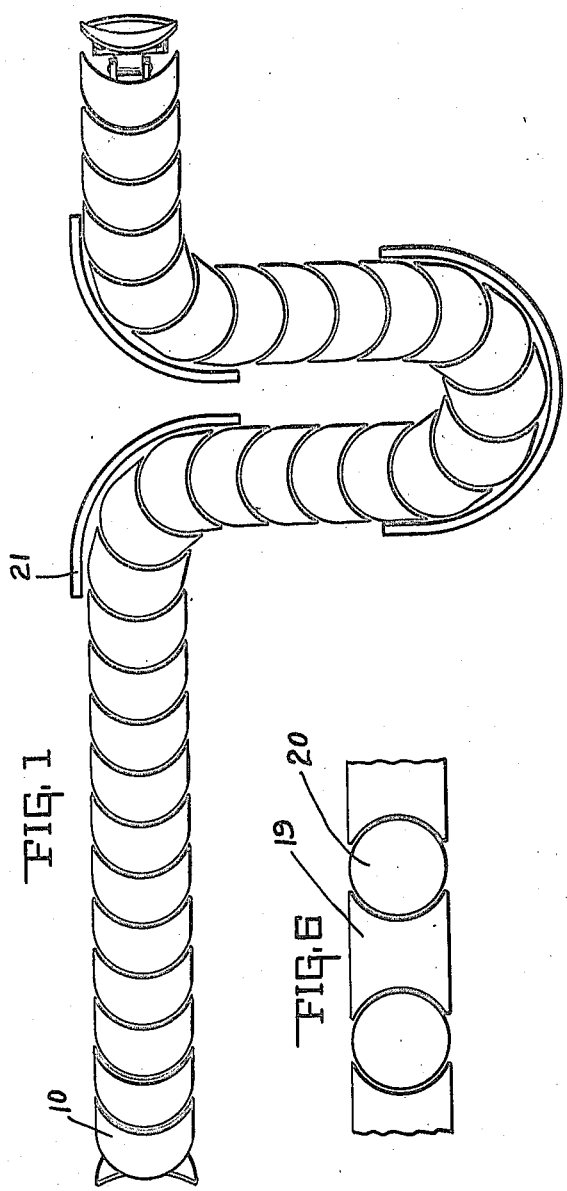
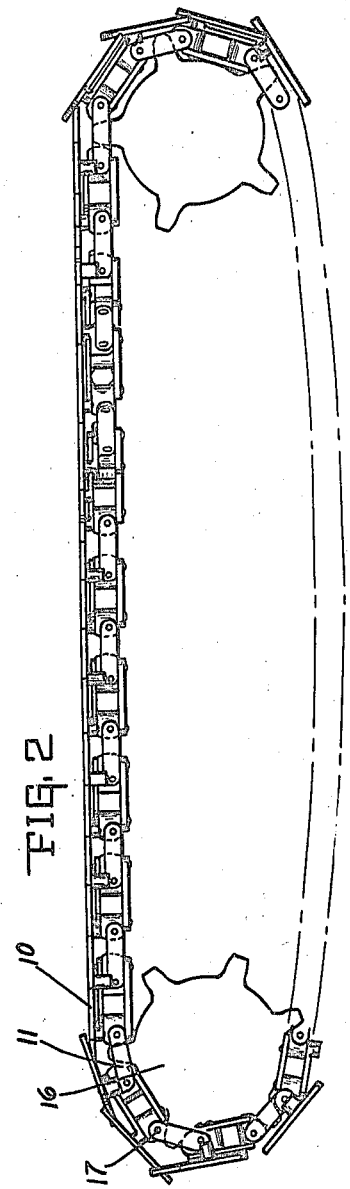
Inventor
BENJAMIN H. PURCELL
By  ........
Attorney

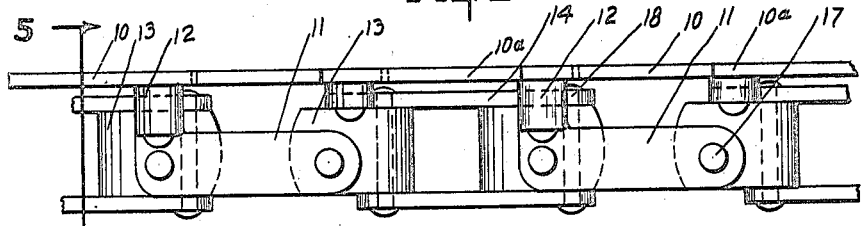
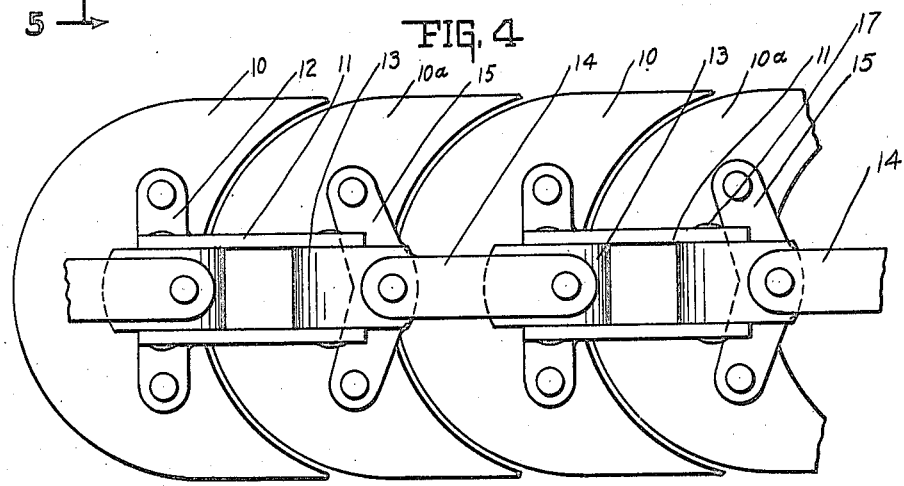
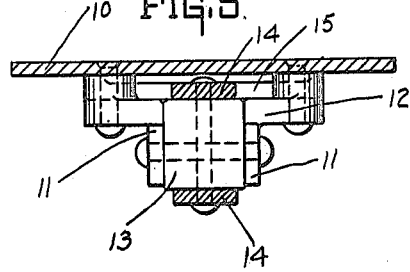

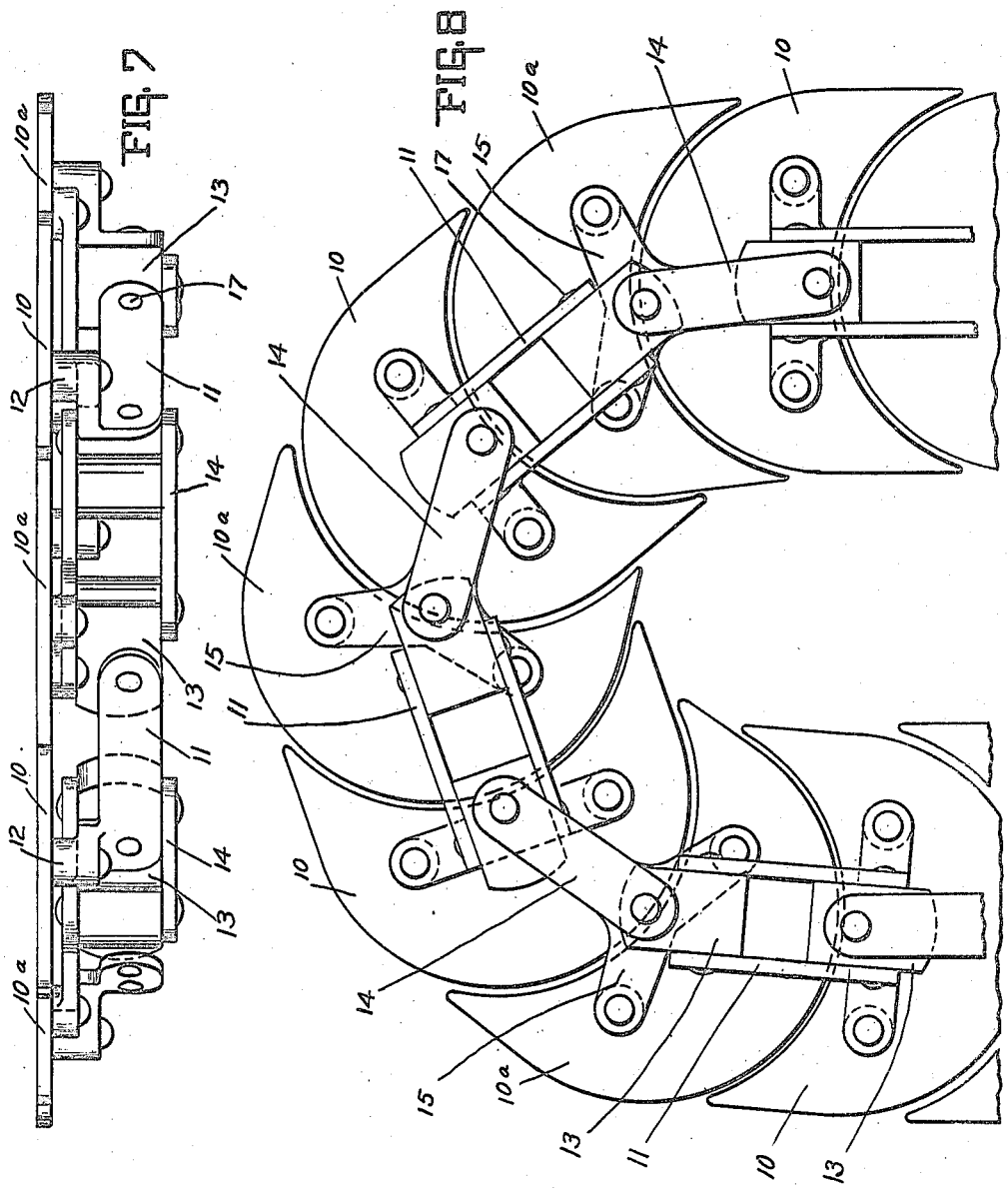

UNITED STATES PATENT OFFICE.

BENJAMIN H. PURCELL, OF TERRE HAUTE, INDIANA, ASSIGNOR OF ONE-THIRD TO EARNEST LAWYER AND ONE-THIRD TO FRANCIS I. HONDERIK, BOTH OF TERRE HAUTE, INDIANA.

UNIVERSAL CARRIER CHAIN.

1,424,850.  Specification of Letters Patent.  Patented Aug. 8, 1922.

Application filed April 2, 1921. Serial No. 458,162.

*To all whom it may concern:*

Be it known that I, BENJAMIN H. PURCELL, a citizen of the United States, and a resident of Terre Haute, county of Vigo, and State of Indiana, have invented a certain new and useful Universal Carrier Chain; and I do hereby declare that the following is a full, clear, and exact description thereof, reference being had to the accompanying drawings, in which like numerals refer to like parts.

This invention relates to an endless carrying chain of the type employed in factories and commercial houses for carrying articles from one part of the building to another, such as canned goods, glass bottles and small articles.

Heretofore there have been two general types of carrying chains, one type being arranged to turn about the sprockets, the axis of which are arranged horizontally so that the chain will pass around the sprockets in a verticle plane only, and in order to carry articles around corners it must be provided with a star wheel or disk to transfer the articles to a transversely moving chain thereby requiring extra parts, motors, driving mechanism and the like.

The other type of carrying chain is that which operates about the sprockets having a vertical axis, said chain being adapted to operate in a horizontal plane only, the top being provided with flights between which there must be enough space to prevent binding or clamping upon each other when the chain is traveling about the sprocket. In this type of chain the outer side must necessarily open up thus forming a space in which the articles being conveyed may lodge, causing breakage or damage to the article or chain.

It is the main object of this invention to provide a universal carrier or chain which must operate about sprockets having a vertical axis as well as sprockets having a horizontal axis and may turn corners in any direction to accommodate it to the necessities of the plant and also provide a continuous unbroken surface when passing about corners so that there will be no open spaces while turning the corners in which articles may drop. This construction permits a continuous unbroken carrying surface of equal width whether the chain is moving in a straight line or turning about a sprocket and permits the use of one continuous chain in a conveyer system with one driving motor. The flexibility of the chain permits the return to be made either on the under side of the conveyer member, under floors, overhead or around obstacles in a manner best suited to local conditions. Also the chain may be kept right side up upon its return, allowing the top side to be covered with suitable material for the protection of articles carried, as in conveying hot ware in glass factories and the like. Also this permits the shape of the flights to be formed in a manner to suit the shape of articles being carried. The construction of the universal chain tends to eliminate the objectionable features of the common types of chain, requiring less space for installation, only one driving mechanism and motor, an uninterrupted and unbroken carrying surface and less parts to get out of order, thereby increasing the efficiency and reducing the cost of manufacture.

The full nature of this invention will be understood from the accompanying drawings and the following description and claims.

Fig. 1 is a plan view looking down on the carrying chain. Fig. 2 is a side elevation of a chain passing through a vertical plane. Fig. 3 is an enlarged view of a side elevation of a section of the chain. Fig. 4 is a plan view of the chain section shown in Fig. 3 looking on the under side thereof. Fig. 5 is a section taken on the line 5—5 of Fig. 3. Fig. 6 is a plan view showing a modified form of the top of the chain. Fig. 7 is a side elevation illustrating the carrier passing about a curve in a horizontal plane. Fig. 8 is a plan view on the under side of the carrier passing about a curve in a horizontal plane.

In the drawing there is shown a universal conveying chain having a carrying surface comprising a plurality of crescent-shaped plates or flights 10, said flights being so arranged with respect to each other that their surfaces will be flush and the inwardly curved forward edge of each flight will abut and embrace the outwardly curved rear edge of the adjacent flight as disclosed in the drawings. Each plate or flight 10 is rigidly secured to the links 11 through the member 12. The links 11 are pivoted at each end to the blocks 13, which in turn are pivoted between the links 14, the links 11 and 14 being so arranged that the links 11 pivot on said blocks about a horizontal axis while the links 14 pivot on said blocks about a vertical axis. In a similar manner to the mounting of the flights 10 on the links 11, the intermediate flights 10ª are rigidly mounted upon the links 14 through the brackets 15 which are integral therewith. The shape of the plates or flights are such that their forward edges are concave, having a radius substantially equal to the distance between the pivotal connections. As shown herein the radial center of the forward edge of each flight is at the pivot point of the forward block 13 of the section of the link 11 or 13 upon which the flight is mounted. The back side of each flight is convex and of a shape to coincide with the forward edge of the rear adjacent plate having the same curvature thereof. The sides of the flights are straightened and extend forwardly at a tangent to the curved rear edge.

When the chain is mounted on the sprocket 16 having a horizontal axis, the sprocket teeth engage between the links 11 and blocks 13 pivoted thereto, as shown in Fig. 2. The chain will pass around the sprockets in a vertical plane, the change in direction being effected about the pins 17 connecting the links 11 to the blocks 13. In passing around the sprocket wheels having a vertical axis, or extending in a horizontal plane, the teeth of said sprocket wheel engage between the links 14 and their respective blocks 13, the change in direction being effected about the pivot pins 18, as illustrated in Figs. 7 and 8.

The design of the flights are such that they will be free to swing horizontally with respect to each other about their respective pivot points so that they will always present an unbroken surface of equal width. The modified form of flights shown in Fig. 6 illustrates another type of design which functions in the same manner as the crescent-shape flights, the flights 19 being secured to the links or chain in such a manner as to swing about the center of the circular flights 20 as a pivot.

The chain may be guarded on each side by the rails 21, if desired, which would preferably be placed about the outer edge of the lateral curves, as shown in Fig. 1 to prevent the articles carried from being thrown off at a tangent by centrifugal force, and the turning movement of the flights with respect to each other.

The invention claimed is:

1. A universal carrier comprising a flexible belt adapted to curve about a horizontal and a vertical axis, and means mounted on said belt adapted to provide a horizontal uninterrupted carrying surface of constant width while passing around a vertical axis so arranged as to permit said belt to return about a horizontal axis and carry articles about a vertical axis.

2. A universal carrier comprising a carrying chain having links pivoted at right angles to each other adapted to be driven around sprocket wheels supported on either horizontal or vertical axes, and means mounted on said links adapted to provide a horizontal uninterrupted carrying surface of constant width while passing around a vertical axis, so arranged as to permit said carrier to return about a sprocket mounted on a horizontal axis and carry articles about a sprocket mounted on a vertical axis.

3. A universal carrier comprising a carrying chain having links pivoted at right angles to each other adapted to be driven around sprocket wheels supported on both horizontal and vertical axes, and a plurality of complementary supporting members mounted on said links adapted to provide a continuous and uninterrupted carrying surface of constant width while passing around a vertical axis so arranged as to permit said carrier to return about a sprocket mounted on a horizontal axis and carry articles about a sprocket mounted on a vertical axis.

4. A universal carrier comprising a link chain adapted to be carried about a wheel mounted on a horizontal axis and a wheel mounted on a vertical axis, said chain comprising a plurality of blocks, links pivotally connected to said blocks so as to form a universal chain, one of said links pivoting about a horizontal axis and another of said links pivoting about a vertical axis, and a carrying surface secured thereon.

5. A universal carrier comprising a link chain adapted to be carried about a wheel mounted on a horizontal axis and a wheel mounted on a vertical axis, said chain comprising a plurality of blocks, links pivotally connected to said blocks so as to form a universal chain, one of said links pivoting about a horizontal axis and another of said links pivoting about a vertical axis, and a plurality of carrying plates mounted on said links so arranged that their edges will remain substantially adjacent each other when said chain curves in a horizontal plane.

6. A universal carrier comprising a link chain adapted to be carried about a wheel mounted on a horizontal axis, and a wheel mounted on a vertical axis, said chain comprising a plurality of blocks, links pivotally connected to said blocks so as to form a universal chain, one set of said links pivoting about a horizontal axis and another set of said links pivoting about a vertical axis, and a plurality of carrying plates independently secured to each set of said links, said carrying plates being provided with adjacent curved edges of a radius substantially the same as the pitch of said chain and so arranged that each succeeding plate will clear the rear edge of said preceding plate as said chain curves in a horizontal plane.

In witness whereof, I have hereunto affixed my signature.

BENJAMIN H. PURCELL.